US 12,536,345 B2

(12) United States Patent
Ayalon

(10) Patent No.: US 12,536,345 B2
(45) Date of Patent: *Jan. 27, 2026

(54) SYSTEMS AND METHODS OF AUTOMATED DESIGN AND SPATIAL ALLOCATION OF BUILDINGS

(71) Applicant: Ark Automatic Architecture Design Ltd., Gaash (IL)

(72) Inventor: Dity Ayalon, Gaash (IL)

(*) Notice: Subject to any disclaimer, the term of this patent is extended or adjusted under 35 U.S.C. 154(b) by 0 days.

This patent is subject to a terminal disclaimer.

(21) Appl. No.: 18/646,824

(22) Filed: Apr. 26, 2024

(65) Prior Publication Data

US 2024/0273251 A1    Aug. 15, 2024

Related U.S. Application Data

(63) Continuation of application No. 17/267,896, filed as application No. PCT/IL2020/050431 on Apr. 7, 2020, now Pat. No. 11,972,174.

(60) Provisional application No. 62/831,206, filed on Apr. 9, 2019.

(51) Int. Cl.
*G06F 30/13* (2020.01)
(52) U.S. Cl.
CPC .................... *G06F 30/13* (2020.01)
(58) Field of Classification Search
CPC ...................................................... G06F 30/13
See application file for complete search history.

(56) References Cited

U.S. PATENT DOCUMENTS

| 6,859,768 B1 | 2/2005 | Wakelam et al. |
| 8,204,619 B2 | 6/2012 | Heil |
| 8,229,715 B1 | 7/2012 | Teller et al. |

(Continued)

FOREIGN PATENT DOCUMENTS

WO    WO 2014/145592 A1    9/2014

OTHER PUBLICATIONS

Zhang D, Li S, Sun M, O'Neill Z. An optimal and learning-based demand response and home energy management system. IEEE transactions on smart grid. Apr. 8, 2016;7(4):1790-801. (Year: 2016).*

(Continued)

*Primary Examiner* — Chuen-Meei Gan
(74) *Attorney, Agent, or Firm* — Eric L. Lane; Green Patent & IP Law

(57) ABSTRACT

Disclosed embodiments perform automated design for buildings or portions of buildings and machine-generate architectural design and floor plans. Computer-implemented systems and methods of designing multi-unit buildings and portions of buildings include a set of one or more input requirements, a relationships module, an options placement system, a layout predictor system, and a design plan generator. The input requirements include one or more pre-defined footprints and may include local regulatory requirements such as building code, zoning, accessibility, among others. The design plan generator generates an architectural design plan for the building or portion of a building that can be built on the one or more pre-defined footprints. Disclosed systems and methods substantially reduce the design time and cost while increasing the profitability, sustainability and efficiency of construction projects.

19 Claims, 8 Drawing Sheets

(56) References Cited

U.S. PATENT DOCUMENTS

| | | |
|---|---|---|
| 8,482,558 B2 | 7/2013 | Morello et al. |
| 10,346,768 B2 | 7/2019 | Schnackel |
| 2003/0046040 A1 | 3/2003 | Patrucco |
| 2004/0073410 A1 | 4/2004 | Maly |
| 2005/0257437 A1 | 11/2005 | Juten et al. |
| 2009/0128558 A1 | 5/2009 | Morello et al. |
| 2009/0151280 A1 | 6/2009 | Jones |
| 2010/0106654 A1 | 4/2010 | Simpson et al. |
| 2010/0198563 A1 | 8/2010 | Plewe |
| 2011/0054652 A1 | 3/2011 | Heil |
| 2011/0191069 A1 | 8/2011 | Madsen et al. |
| 2011/0288672 A1 | 11/2011 | Cunney et al. |
| 2012/0296611 A1* | 11/2012 | Teller .................. G06F 30/13 703/1 |
| 2014/0288890 A1 | 9/2014 | Khainson et al. |
| 2015/0066444 A1 | 3/2015 | Almquist et al. |
| 2015/0310136 A1 | 10/2015 | Maletz |
| 2016/0350444 A1 | 12/2016 | Sarao et al. |
| 2017/0329875 A1* | 11/2017 | Detwiler .................. G06Q 10/06 |
| 2018/0260497 A1 | 9/2018 | Vanker et al. |
| 2018/0300435 A1 | 10/2018 | Eckman et al. |
| 2019/0087529 A1 | 3/2019 | Steingrimsson et al. |
| 2019/0102486 A1 | 4/2019 | Desal et al. |
| 2019/0188338 A1 | 6/2019 | Srivastava |

OTHER PUBLICATIONS

Soltanaghaei E, Whitehouse K. Walksense: Classifying home occupancy states using walkway sensing. InProceedings of the 3rd ACM International Conference on Systems for Energy-Efficient Built Environments Nov. 16, 2016 (pp. 167-176). (Year: 2016).*

International Search Report mailed Sep. 29, 2020 in related International Application No. PCT/IL2020/050431.

Written Opinion mailed Sep. 29, 2020 in related International Application No. PCT/IL2020/050431.

Extended European Search Report sent May 11, 2023 in related European Patent Application No. 20786946.2.

TestFit, Gain the competitive edge during feasibility studies, downloaded May 20, 2021 from https://testfit.io/testfit/.

* cited by examiner

SAMPLE PROJECT
INPUT: ZONING AND CLIENT OBJECTIVES

Building type:
Condo/Rental

Preferred Footprint:
50'-0"X65'-0"

Street wall length:
50'-0"

Preferred number of stories:
04

For each floor:
Footprint size/ Unit Mix /Outdoor area
2<sup>nd</sup>
50'-0"X65'-0"/4x1bed/N/A

Number of Stairwells:
02

Number of elevators:
01

SYSTEMS AND METHODS OF AUTOMATED DESIGN AND SPATIAL ALLOCATION OF BUILDINGS

CROSS-REFERENCE TO RELATED APPLICATIONS

This application is a continuation of U.S. patent application Ser. No. 17/267,896, filed Feb. 11, 2021, which claims benefit of and priority to International Application No. PCT/IL2020/050431, filed Apr. 7, 2020, which claims benefit of and priority to U.S. Patent Application No. 62/831,206, filed Apr. 9, 2019, each of which is hereby incorporated by reference in its entirety.

FIELD OF THE DISCLOSURE

The present disclosure relates to systems, methods, and computer-implemented application software for automated design and spatial allocation of multi-unit buildings or portions of multi-unit buildings. Disclosed systems and methods provide the ability to synthesize building data and standardize building design.

BACKGROUND

Numerous governmental and consulting research reports have concluded that the current deficiency of design and coordination in the construction process is the root cause of a large number of design errors, omissions and ambiguities in construction, greatly contributing to poor performance in the construction industry worldwide. Approximately 70% of construction projects are delayed due to design and coordination errors, and subsequently over budget. This results in significant material waste and inefficient use of labor, a significant decrease in profitability, and worse of all, contributes to the loss of human lives on construction sites.

Until today the design and construction process has been done manually by architects and engineers using a trial and error process. The engineers typically use the schematic design done by the design architect to embed their own layer of engineering that would complement the architectural design. This process is very complex as it involves various building trades, and until today has not been performed optimally, resulting in many discrepancies between the different trades.

The process of placement of public components, e.g., stairs, elevators, corridors, is done manually by the conventional architect using trial and error techniques of drafting lines and components placement. Unit boundaries splitting is currently done manually using unit shape splitting and then trying to place components in them and design the layout. Access path checking also is done manually by the conventional architect viewing and constructing a path visually from the entry door to each room and section of the unit and making sure the path is wide and clear enough according to the regulations and for providing human comfort. For component expansion, an architect typically would start a design with placement of the interior components which consist of the minimal required size. After the initial placement, the architect would try to gradually increase the sizes (i.e. expand the rooms) to find the optimal and most convenient size for each component. Other parts of the design process, such as clearance checks, options placement, and layout, also are done manually and/or by trial and error.

Improving design and technology in the construction process will significantly increase project profitability and sustainability. The first step of every construction development process is an architectural design. The current labor-intensive design process is very slow (taking weeks to months), expensive (requires many design hours from highly skilled architects) and inefficient (often the design does not optimize the project's objectives). Human architectural design is inherently inefficient, as it relies on the limited intellectual and creative capacities of the individual architect to create and analyze sufficient design options. As a result, it is almost impossible to achieve an optimal, efficient, and most importantly, profitable design option for the project.

Thus, there is a need for a system and method that will minimize the coordination errors that are common in today's architectural and constructions practices. There is also a need for a system and method that will reduce the time and cost of the architectural design process. There is a need for a system and method that can analyze all available design options and generate optimal and profitable design options for building projects.

SUMMARY

The present disclosure, in its many embodiments, alleviates to a great extent the disadvantages of known architectural and construction design processes by providing computer-implemented systems and methods of synthesizing building data, standardizing building design, and designing buildings and portions of buildings. Disclosed embodiments perform automated design for multi-unit building types or portions of buildings and machine-generate architectural design and floor plans for buildings. Exemplary embodiments can be used for residential multi-family designs and floor plans for other building types including, but not limited to, hotels, offices, schools, hospitals, and other high-rises and multi-unit occupancies. The technology is applicable to the entire range of the residential market, from the micro-level detailed design of the basic urban unit to neighborhoods in metropolitan areas and ultimately the macro-level design of an entire urban area. Disclosed systems and methods substantially reduce the design and construction time and cost while increasing the profitability, sustainability and efficiency of constructions projects.

Disclosed embodiments provide a multi-tier, complex system that combines CS algorithms and neuron networks to generate automated architectural and engineering designs for residential construction projects. The system has the capacity to generate over a thousand permutations for each requested design. The outputs are fed into the neuron network in order to train the network to grade every design option and select the optimized one that would fit a specific project objective. In exemplary embodiments, the first tier generates Architectural Schematic Designs and floor plans (SD) followed by a second tier, Ark Automated Engineering and system Design and Coordination, which generates Design Development documents (DD) and Construction Documents (CD) that may include a detailed architectural design and schematic integrated design of the building systems (Structural, MEP-Mechanical, Plumbing and Electrical). The Engineering and Systems Design and Coordination software comprises a combination of grid search algorithms and CS and ML algorithms that use spatial allocation in order to create numerous design options.

The disclosed innovative approach utilizes data from thousands of successful design projects and the experience of architectural and building professionals to create an optimized design solution for each individual construction project, as opposed to the one-time design capabilities of the conventional human designer. It is based on extensive research focusing on the construction technologies of multi-unit buildings and research on various existing building technologies such as modular and panelized construction, precast concrete versus steel structures and more. Then building components were analyzed and tagged with metadata, developing a standardization concept for residential building system design that can be used in many configurations and is applicable to other multi-unit buildings.

The unique data analysis methods generate many automated design options, substantially improving the quality and efficiency of the current labor-intensive design process. More particularly, exemplary systems and methods generate an automated architectural design on a pre-defined grid/footprint and place the architectural components on the grid in accordance with a sophisticated hierarchy of sub-algorithms that may include local regulatory requirements such as building code, zoning, accessibility, among others. The result is a design that is not only functional and places all the required components in the 3D space, but also optimizes the space and the building systems design, improves and optimizes human comfort and movement in the space and improves coordination between the trades, in order to minimize expenses and maximize profitability.

While the automated design aspect focuses on the Architectural Schematic Design, the Engineering and system design aspect focuses on the Design Development stage, when all segments are precisely specified and used to construct a complete building with all its trades (architectural, mechanical/MEP and structural). Disclosed systems and methods coordinate the design and integrate the trades involved, aiming to optimize the design in accordance with the client's objectives and minimize coordination errors that are extremely common in today's construction practice. Better coordination between the trades (architectural, MEP and Structural) will increase the profitability of building projects.

Exemplary embodiments of computer-implemented systems and methods of designing buildings and portions of buildings comprise a set of one or more input requirements, a relationships module, an options placement system, a layout predictor system, and a design plan generator. The input requirements include one or more pre-defined footprints. The relationships module defines a hierarchy of relationships between the one or more pre-defined footprints, and the relationships include one or more of adjacency, dependency, and connectivity. The options placement system analyzes the one or more input requirements and the hierarchy of relationships and provides one or more optional feasible designs for a building or portion of a building that can be built on the one or more pre-defined footprints. The layout predictor system analyzes the one or more optional feasible designs and selects an optimal feasible design based upon the one or more input requirements. The design plan generator generates an architectural design plan for the building or portion of a building that can be built on the one or more pre-defined footprints.

In exemplary embodiments, systems of designing buildings and portions of buildings further comprise one or more subsystems. These may include a public component placement system designing public components within the building or portion of a building. The building or portion of a building may comprise one or more individual units, and a unit boundary splitter system may be provided which defines and sets external boundaries between the one or more individual apartment units. An access path check system may be provided which checks for paths between components in the building or portion of a building and finds the shortest paths between components. In exemplary embodiments, a clearance check system is provided which incorporates accessibility and building code regulatory requirements into the architectural design plan.

Exemplary embodiments of computer-implemented systems and methods of designing buildings and portions of buildings further comprise a component expansion system expanding components toward each other simultaneously. A wall alignment system aligning interior walls of the one or more individual apartment units and adjusting proportions and interrelationships between apartment units and components also may be provided. Exemplary embodiments further comprise an entrance floor layout design system designing an entranceway and other public areas of the building or portion of a building. A mechanical and structural design system may be provided to design mechanical, electrical, and plumbing systems for the building or portion of a building. Exemplary embodiments further comprise an environmental and energy code system improving environmental and energy performance of the building or portion of a building. A synchronization system synchronizing between the computer-implemented system and associated systems may also be provided.

Exemplary embodiments of computer-implemented methods of synthesizing building data and standardizing building design comprise creating a database of building components, receiving one or more inputs requirements including one or more pre-defined footprints, defining a hierarchy of relationships between the one or more pre-defined footprints, analyzing the one or more input requirements and the hierarchy of relationships and providing one or more optional feasible designs for a building or portion of a building that can be built on the one or more pre-defined footprints, and analyzing the one or more optional feasible designs and selecting an optimal feasible design based upon the one or more input requirements. In exemplary embodiments, the relationships include one or more of adjacency, dependency, and connectivity.

Exemplary embodiments further comprise generating an architectural design plan for the building or portion of a building that can be built on the one or more pre-defined footprints. The building or portion of a building may comprise one or more individual units such as apartments, offices, hospital rooms, etc., and exemplary methods may further comprise defining and setting external boundaries between the one or more individual units such as apartments, offices, hospital rooms, etc. In exemplary embodiments, a complete building design plan incorporating a plurality of trades is generated. The plurality of trades may include one or more of architectural, mechanical, electrical, plumbing, and structural. The building or portion of a building may be a residential apartment building, a hotel, a hospital, or an office building.

Accordingly, it is seen that systems and methods of synthesizing building data, standardizing building design, and designing buildings and portions of buildings are provided. These and other features and advantages will be appreciated from review of the following detailed description, along with the accompanying figures in which like reference numbers refer to like parts throughout.

BRIEF DESCRIPTION OF THE DRAWINGS

The above-mentioned features and objects of the present disclosure will become more apparent with reference to the following description taken in conjunction with the accompanying drawings wherein like reference numerals denote like elements and in which.

DETAILED DESCRIPTION

In the following detailed description of exemplary embodiments of the disclosure, reference is made to the accompanying drawings in which like references indicate similar elements, and in which is shown by way of illustration specific embodiments in which disclosed systems and devices may be practiced. These embodiments are described in sufficient detail to enable those skilled in the art to practice the embodiments, and it is to be understood that other embodiments may be utilized and that logical, mechanical, functional, and other changes may be made without departing from the scope of the present disclosure. The following detailed description is, therefore, not to be taken in a limiting sense, and the scope of the present disclosure is defined by the appended claims. As used in the present disclosure, the term "or" shall be understood to be defined as a logical disjunction and shall not indicate an exclusive disjunction.

Figure 1:
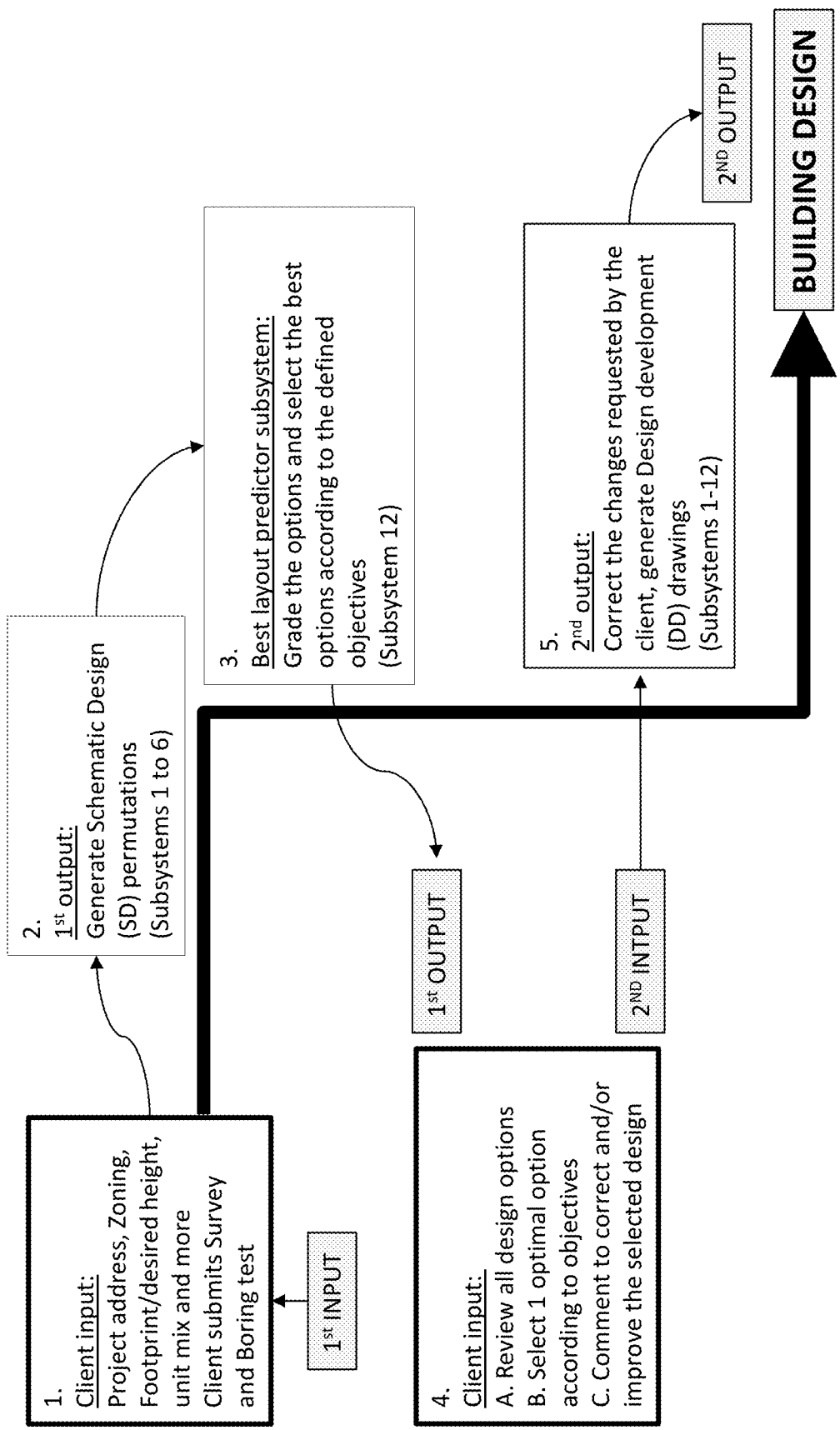
FIG. 1 is a process flow diagram showing an overview of an exemplary embodiment of a system and method of designing buildings and portions of buildings in accordance with the present disclosure.
Figure 2:
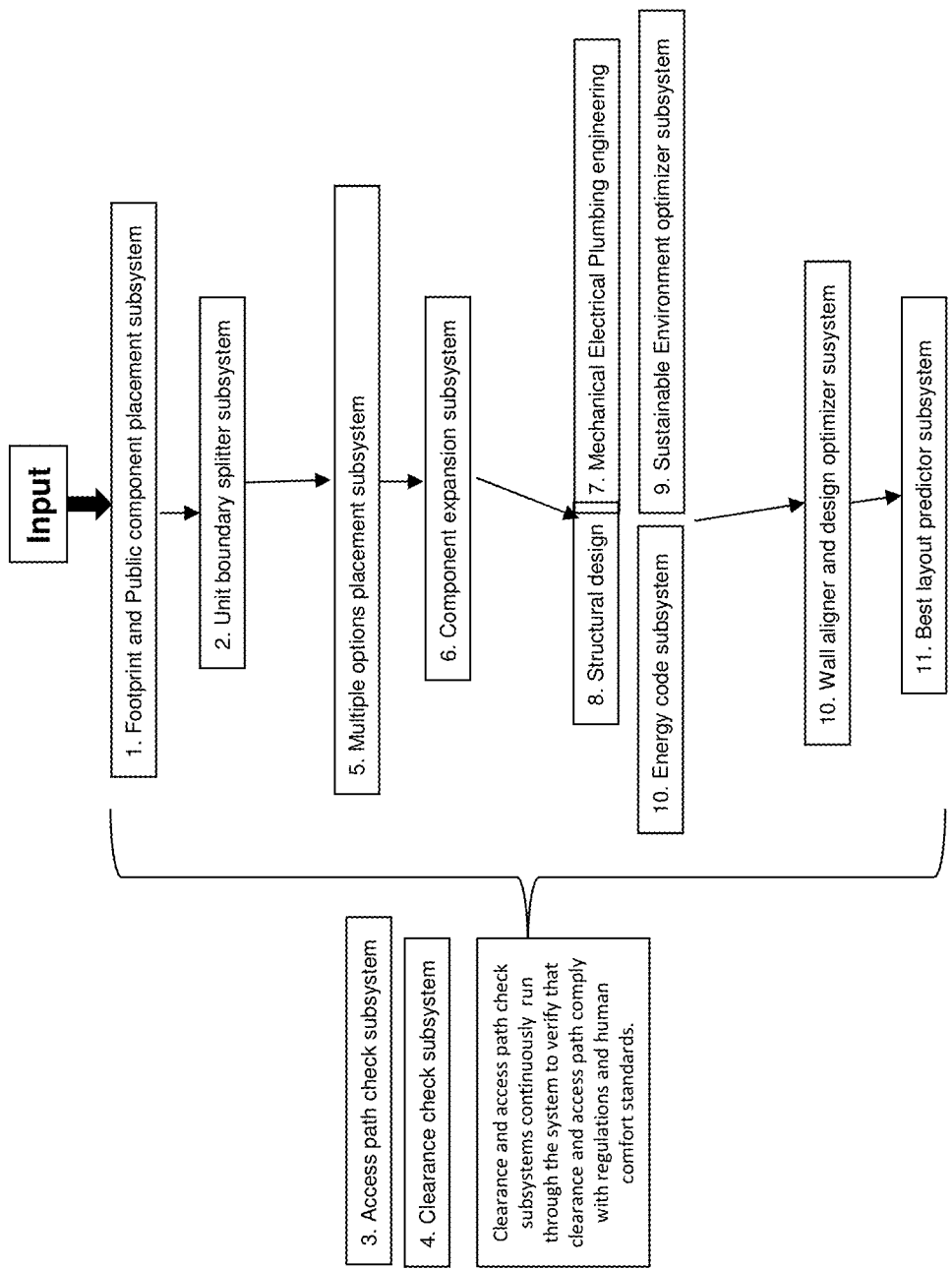
FIG. 2 is a process flow diagram showing an exemplary embodiment of a system and method of designing buildings and portions of buildings in accordance with the present disclosure.

FIGS. 1 and 2 show exemplary embodiments of systems and methods of synthesizing building data, standardizing building design, and designing buildings and portions of buildings. More particularly, FIG. 1 shows an exemplary system use case, and FIG. 2 shows an exemplary system flow chart. In general, disclosed embodiments provide automatic spatial allocation and design of multi-unit architectural design along with structural and MEP (Mechanical, Electrical, Plumbing) design. With reference to FIG. 1, given a set of input requirements (Step 1), including but not limited to, address, zoning, lot dimensions, building height, required setbacks, floor area ratio, maximum buildable area, different required units mix, their sizes and amounts, disclosed systems and methods create the optimal design for the required program including the optimal design for the units' (dwellings'/offices'/suites') internal layout.

Figure 3:
FIG. 3 is a top view of a lot and input requirement of a sample architectural project design generated by an exemplary embodiment of a system and method of designing buildings and portions of buildings in accordance with the present disclosure.
Figure 4:
FIG. 4 is a top view of lot, pre-defined footprint, and input requirements of a sample project designed by an exemplary embodiment of a system and method of designing buildings and portions of buildings in accordance with the present disclosure.

As shown in FIG. 1, according to the specific requirements (Step 1), such as specific address, lot size, zoning and code input (allowable occupancy, floor area, height, footprint, street wall, setbacks etc.) combined with the client's specific needs such as building type, function and economic model (for example, rental versus condo) unit type mix (studio, 1 bedroom, 2 bedroom etc.) budget etc., an architectural design is synthesized, produced and sent to the client. A sample first input (zoning) for generating architectural design is illustrated in FIG. 3, and a sample second input (zoning and client objectives) for generating architectural design is shown in FIG. 4. The system generates various options that would follow the client's needs, usually maximizing parameters that were requested by the client, such as: saleable area and or number of units that could be built. Referring to FIG. 1, the schematic design (Step 2) is refined into a detailed floor plan for each floor. At this stage, all segments are precisely specified and used to construct a complete building with all its systems (architectural, mechanical and structural).

The systems and methods rely on deep research of multi-unit building design that takes into consideration human comfort, habits, needs, and social standards combined with building code, zoning, accessibility and all other regulatory requirements into its design schemes. The analysis redefines the architectural components of multi-unit building design and the inter-relations between all the predefined components. The components are functional cellular spaces with defined criteria of their use, size ratio, scale, form, proportions and inter-relationships such as passageways, clearances, and adjacencies. Disclosed processes utilize a set of predefined components and automatically allocate, place and reconfigure them in a confined space according to the given input requirements.

The systems define the hierarchy of adjacency, dependency and connectivity relationships between the components and rooms and select the optimal design. In exemplary embodiments, the definitions may be categorized with the following hierarchy: (1) mandatory definitions such as egress and clearances according to the regulations; and (2) guidelines for optimal design practice, e.g., a kitchen is much more likely to be adjacent to a living room than to a bedroom. A privacy gradient mechanism may be provided to place the components according to a predefined hierarchy: public and private with additional hierarchy within the unit for common areas, such as the living room and kitchen closer to the entrance, while private spaces, such as bedrooms, and bathrooms should be further away.

At the Design Development phase, the software coordinates the design and integrates between the systems aiming to optimize the design and minimize coordination errors that are common in today's practice. In some embodiments, the permutations number that the algorithm generates may be limited to a reasonable number, which could be 1,024 for each requested footprint in some embodiments. As shown in FIG. 1, each permutation/design-option is then graded (Step 3) in accordance with predefined parameters that reflect the project's specific objectives, and the permutations with the highest score are offered to the client and, in addition, fed into the system to serve as training data for the ML system.

Exemplary embodiments are used on a personal computer, which is in communication with a system server or a microcontroller. The personal computer is linked to the Internet, to the cloud, and to another server either in a direct hardwired fashion or indirectly in a wireless fashion. The computer comprises an operating system communicatively coupled to a processor architecture. In one embodiment, the processor architecture includes a number of processors, which couple to non-volatile memory. The systems, subsystems, software and algorithms described in detail herein are run and operated on the personal computer and/or through the internet and/or cloud. Design information about building, portions of building, units, codes, etc. described herein may be stored in the memory on the personal computer and/or the server, the internet, or the cloud.

Exemplary embodiments comprise computer application software powered by various algorithms composed of detailed description+guidelines for each algorithm and sub-algorithm. For instance, the software may include a first algorithm that generates the design of the footprint and the settings of the common public functional spaces, including but not limited to, lobby, corridor, staircases, elevators, mechanical room (if required) and the boundary walls of each units. A second algorithm may be provided to design the interior of each unit with its components. For example, in a multi-family building, the second algorithm would design the interior of each dwelling unit including, but not limited to, the following components: entry, living/dining room, kitchen, bedrooms, bathrooms and closets.

Figure 5:
FIG. 5 is a chart of exemplary embodiments of several subsystems and a sample architectural project conceptual design generated by an exemplary embodiment of a system and method of designing buildings and portions of buildings in accordance with the present disclosure.

As illustrated in FIGS. 1, 2 and 5-8, exemplary systems and methods utilize several subsystems working together in series or parallel to generate building designs. For each given unit space, area, geometry and requirements, an options placement system or subsystem finds optional feasible designs for the interior design of each unit, e.g., apartment, based on precedent design data. This system is the epicenter of the interior unit design process. With reference to FIG. 5, the options placement system relies on data preparation, creation of a dataset, and various machine learning models utilizing various architectural parameters, including but not limited to, number and size of layers, activation function, and layer types. This system is built with a unique dataset of proofed footprints, use of the dataset to train the machine learning models, and verification that the design suits its inter-relations and meets the requirements and objectives. Implementation uses GPUs for an accelerated computation. Exemplary embodiments use deep-learning models to acquire human-like expertise to achieve higher performance in finding feasible designs. One or more machine learning models may be utilized in an options placement system, including but not limited to, a data classification model and a data generation model.

An exemplary data classification model is based on finding precedential successful designs and reusing them (with required modifications) in similar future situations and would work as follows. The unit outer layout and requirements are fed to a classifier, which is trained to find all the compatible footprints that exist in the dataset. More particularly, a deep learning classifier (which could be based on ConvNet or other systems known in the art) receives as input pairs of layouts (in the form of an image) and requirements lists (footprint, size and shape of the apartment, number of rooms, placement of the entrance and front/window wall etc.). The pairs are labeled as "true" where the layout matches the requirements or "false" where there is a mismatch.

After the training process, the model identifies which footprints in the dataset comply with the demands of a specific requirements list. Therefore, when having a request for a new apartment with specific requirements, the trained model functions as follows: the new requirements list is fed into the model along with each of the layouts in the dataset. For each such pair, the model outputs a classification score, and then the layouts with the highest scores are selected as the most probable ones to match the new requirements. This method is very straightforward: instead of starting to design the interior of each new apartment from scratch, it can find the already designed layouts with similar characteristics and use them.

Instead of drawing from existing samples in the dataset, an exemplary data generation model uses those samples to train a deep-learning model to generate new layouts with similar characteristics. Several generative models could be utilized, including but not limited to, Variational Autoencoders and Generative Adversarial Networks (GANs). Generative models learn the underlying rules that govern the different examples in the training set. A generative model is trained on different types of layouts (different shapes, varies elevations, number of rooms etc.), so that the model can generalize the underlying architectural rules and produce new layouts that correspond to a new requirement list.

In exemplary options placement systems utilizing a data generation model, autoencoders are used for data generation. The encoder is first trained to output classification scores and then use the penultimate layer as the "code" for further reconstruction. Variational autoencoders further expand the generative ability of the model by making its encoder not output an encoding vector of size n, but rather output two vectors of size n: a vector of means, $\mu$, and another vector of standard deviations, $\sigma$. The mean vector controls where the encoding of an input should be centered around, while the standard deviation controls the "area", how much the encoding can vary from the mean.

As encodings are generated at random from anywhere inside the distribution, the decoder learns that not only is a single point in latent space referring to a sample of that class, but all nearby points refer to the same as well. This allows the decoder to not just decode single, specific encodings in the latent space (leaving the decodable latent space discontinuous), but ones that vary slightly too, as the decoder is exposed to a range of variations of the encoding of the same input during training. In exemplary embodiments, the input to the encoder would be layouts (images), and it would be trained to extract from the footprint a requirement list. The latent representation of that list will serve as the "code" for the decoder, which will learn to reconstruct a corresponding layout (namely the output will be an image). After training, the decoder is used to generate new layouts according to an input of new requirements lists.

In exemplary options placement systems utilizing a data generation model, GAN is used for data generation. GAN is a setup where two neural networks contest with each other in a game. One neural network, called the generator, generates new data instances, while the other, the discriminator, evaluates them for authenticity, i.e. the discriminator decides whether each instance of data that it reviews belongs to the actual training dataset or not. The generator's training objective is to increase the error rate of the discriminator (i.e., "fool" the discriminator network by producing novel candidates that the discriminator thinks are not synthesized).

The generator is typically a deconvolutional neural network, and the discriminator is a convolutional neural network. In exemplary embodiments, the input to the discriminator would be pairs of layouts (images) and their corresponding requirements lists, and the input to the generator would be random noise vectors and requirements lists. After training, the generator would output layouts that correspond to the requirements and fool the discriminator.

Figure 6:
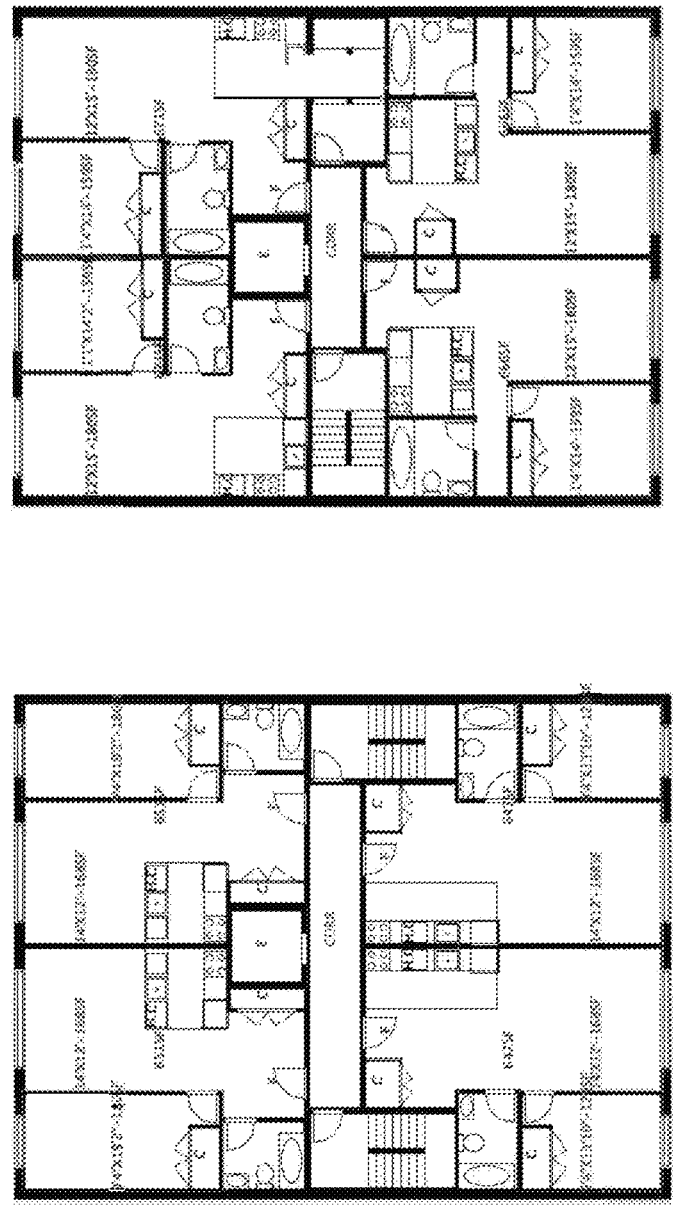
FIG. 6 is a chart of exemplary embodiments of several subsystems and a sample architectural project schematic design generated by an exemplary embodiment of a system and method of designing buildings and portions of buildings in accordance with the present disclosure.

Referring to FIGS. 1 and 6, in exemplary embodiments a layout predictor system analyzes the optional feasible designs and selects an optimal feasible design based upon one or more input requirements. This system has a machine learning model trained with thousands of different layout designs. More particularly, the system utilizes machine learning and is trained over thousands of existing precedential architectural design data to grade the various design options to select the best option by a given set of requirements intertwined with predefined parameters. Based on the acquired experience, the model will have the ability to grade new design options in order to select the best one and evaluate and rate good architectural designs vs. not satisfying or bad designs. This system can score the design using an analytic and systematic analysis, based on thousands of previous, already implemented, succesful designs.

The initial core functions include a public components placement function and an interior unit design function. These subsystems can output multiple feasible design options for the customer (architect/RE developer) to choose from. The preferences can be affected by objective and measurable considerations (such as utilizing the saleable area) or by aesthetic inclinations. The accumulated data of the different and chosen design options are sorted and mapped by the R&D team, and can be used as a training set for a deep-learning algorithm that will receive layouts and requirements as input, and will output a score which will indicate the probability of that layout to be selected. This algorithm will serve as a recommendation system that will assist customers to select a suitable option and will be selective and specifically adjusted to different kinds of customers, urban areas etc.

The layout predictor system relies on feature analysis, definition and writing requirements by the architect, training the machine learning system to score each design option by exposing it to analysis of meta-data of floor plan designs, and finding correlations between data points and targets. The data points of previous successful designs generated by the system are evaluated, cleaned, and prepared to train the machine learning model that is fed with new designs and could rate how good they are and how similar they are to previous successful designs.

Turning to FIGS. 5 and 6, a public component placement system, provided with a required footprint geometry, designs and places all public components within the footprint area. For instance, it places public components of a building such as stairs, elevators, corridors, mechanical and service areas in the optimized locations so as to maximize saleable space that will be left for the dwelling units, while maintaining local required regulations such as clearances and egress. In exemplary embodiments, the public component placement system tries all available placement scenarios known for the shared components and verifies that all regulations are met and there is access way to all components. It finds the optimal placement option that maximizes the area that is left for the dwelling units while fitting all required shared components in place. This system also can optimize critical aspects such as maximizing saleable space and number of dwelling units.

The public component placement system functions by performing and/or utilizing feature analysis, definition and writing requirements by architects such as analysis of data (e.g., relevant floor plans), descriptions of the design process and schemes of the public component's sizes, proportions, functions and inter-relations as guidelines for the development team. It relies on translation of complex regulatory requirements such as building code, zoning and accessibility into schemes that would create the basis of the public area's spatial allocation. This system may incorporate a machine learning model for optimization grading.

In exemplary embodiments, a unit boundary splitter system or subsystem, illustrated in FIG. 5, splits a unit within the given footprint area. This system is responsible for defining and setting the external boundaries of each individual unit and will do so in a way that it would fit the required number of units and optimize the split space to the required mix of unit type, e.g., 1×studio, 2×single bedroom. It automates the process while optimizing space and making sure that each unit split will be done in a way that, compared to its area, is most maximized to the unit type, number of edges in split unit is reduced to a minimum. This system fully optimizes the process by creating the most comfortable unit shape while fitting the best area size to the required unit types, to the number of total units.

The unit boundary splitter system functions by performing and/or utilizing feature analysis, definition and writing requirements by architects, data analysis of unit boundaries setting, description and schemes that would focus on verification of complying access to each unit and potential unit shape to a complex set of requirements, that include regulatory and client requirements, human comfort standards and accessibility needs. The unit boundary splitter system utilizes optimization parameters such as maximization/minimization of certain area relations and number of units. In exemplary embodiments, it may incorporate a machine learning model for optimization grading.

Figure 7:
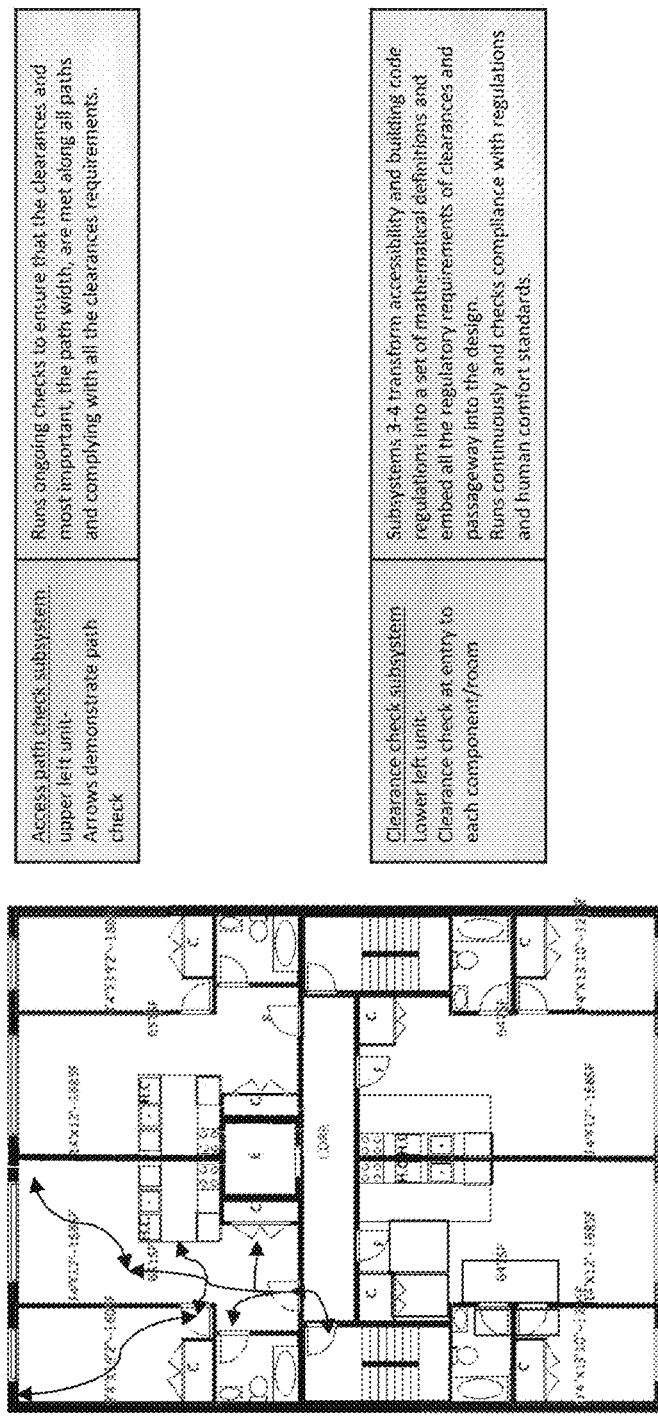
FIG. 7 is a chart of exemplary embodiments of two subsystems and a sample architectural project schematic design generated by an exemplary embodiment of a system and method of designing buildings and portions of buildings in accordance with the present disclosure.

Turning to FIG. 7, during the design process an exemplary access path check system or subsystem checks for the existence of a path from each component to each other component in the layout and finds the shortest distance in the 3d grid. This system runs ongoing checks to ensure that the clearances and most important, the path width, are met along all paths and complying with all the clearance requirements. In exemplary embodiments, this system spirals around the apartment to find the shortest path from each component to each other component and records it in order to use the distances and number of turns that each path provides. The system then constructs the shortest path between all components while making sure it is wide enough and distances comply with egress requirements, according to regulations, and provides enough human comfort.

With reference to FIGS. 5 and 7, in exemplary embodiments a clearance check system or subsystem transforms accessibility and building code regulatory requirements into a set of mathematical roles and definitions. This set of mathematical roles embeds all the regulatory requirements of clearances and passageways in the algorithm design and verifies that any design generated by the software fully complies with all the mandatory regulations. This system continuously runs throughout the component placement process and expansion process and checks compliance with building code and ADA accessibility clearances to all components.

It selects the most optimal entrance clearance for each component by complying with regulations and providing the most optimal human comfort. The clearance check system places the components in a way that makes sure they have enough clearance of length and width according to the regulations. The system continuously verifies that every component has at least one wall that is connected to a clear path with enough clearance for human access. This is done while maintaining compliance with all regulations and providing human comfort. In exemplary embodiments, a machine learning prediction model selects the best accessibility for each component in order to provide optimal human comfort.

The clearance check system utilizes feature analysis, definition and writing requirements by architects, e.g., a thorough selection process of relevant data regarding ability and comfort of movement in the space. It performs analysis and descriptions of paths and clearances, transforming them into spatial guidelines for designing a verification process that constantly enable clearance compliance along the movement path of both public and private areas.

Referring again to FIG. 5, an exemplary component expansion system or subsystem runs after the placement of all components and expands all components towards each other simultaneously according the client's specific objectives. This can be applied to all rooms and components, following a thorough analysis and detailed instructions developed by the architect for the expansion of each component. This complex process is synchronized with the clearance check and access path check systems discussed above to verify that clearances and paths requirements are being met while optimizing component sizes, specific function and shape ratios. This system expands each component in the designed layout, using a machine learning predictor model that would choose the best expansion strategy (towards becoming thinner, expanding equally as a square etc.) and verifies during the parallel process that there always are a clear path and enough good potential clearances. It maximizes the area and function of each room/component in a predefined process, adequate to each component specific parameters The initial implementation of this system will be classic, and based on traditional optimization with constrains algorithm, especially for the public components placement. As for the ML-based interior designs, the expansion system may or may not be required, since the interior designs are based on precedential (quasi-) optimal layouts which already take optimization considerations into account. In some instances, the designs may be improved by the expansion algorithm, and the accumulated data of the initial+final designs can train a deep-learning model. In exemplary embodiments, the model will receive as input an initial sub-optimal design and will learn to output the final optimized design. It is important to note that the (human) supervising architect may need to apply other manual modifications and improvements to the initial ML designs.

The component expansion system utilizes feature analysis, definition and writing requirements by the architect, including analysis of a vast body of data and transforming it into guidelines of scales, sizes, proportions and inter-relations of each specific room and component within the floorplan. The architect guidelines could be both text and schematic drawings that would be the core of the layout design optimization. Data points collection would be used for the best layout predictor.

Figure 8:
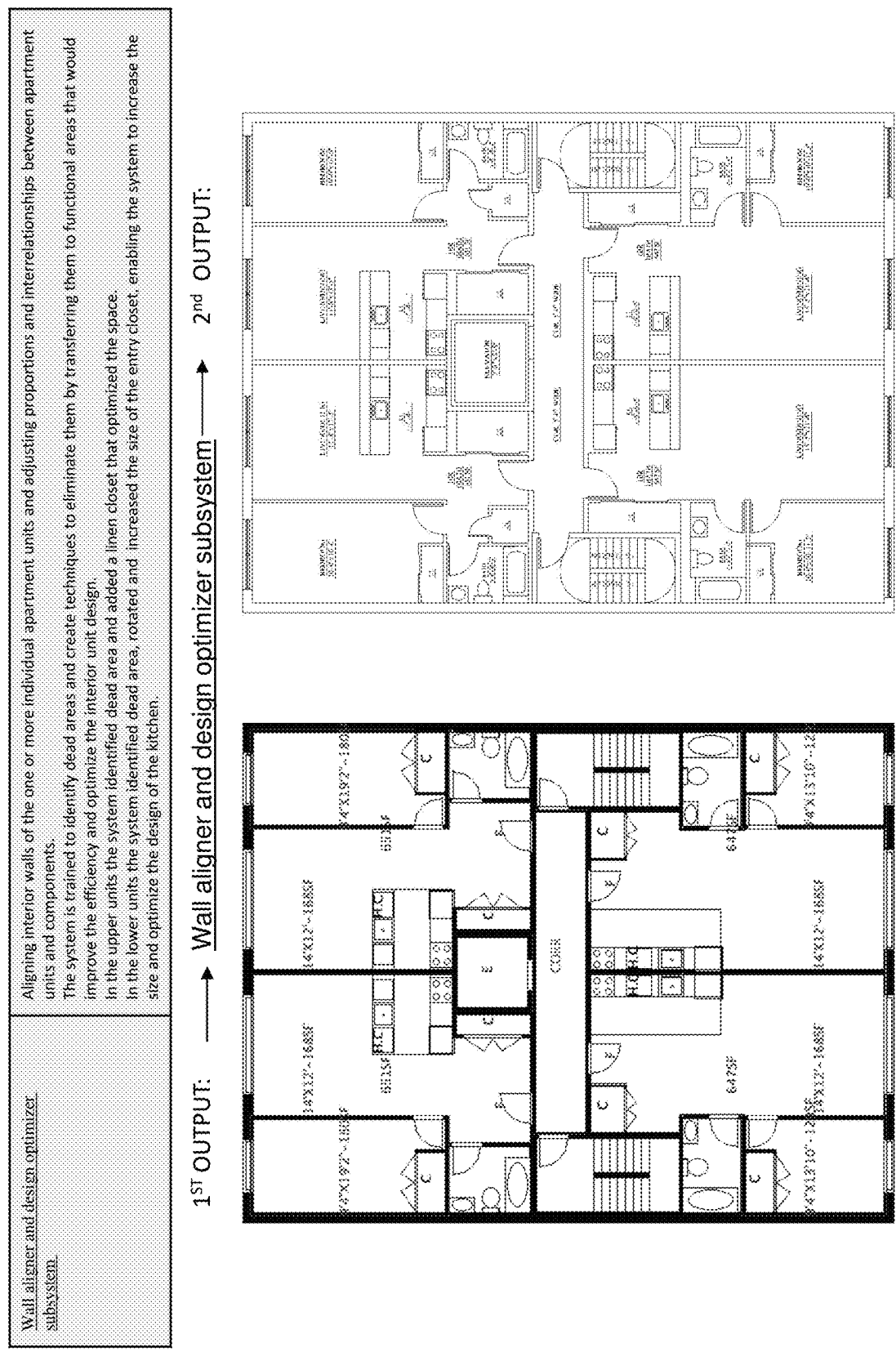
FIG. 8 is a chart of an exemplary embodiment of design optimizer and wall alignment subsystems and a sample architectural project design generated by an exemplary embodiment of a system and method of designing buildings and portions of buildings in accordance with the present disclosure.

In exemplary embodiments and as shown in FIG. 8, a wall alignment system or subsystem runs within the interior unit to align the interior walls and optimize the spatial sizes, proportions and inter-relations between the rooms and components. This system minimizes the number of edges and bumps within the unit walls, minimizing dead areas while optimizing livable and usable spaces. It explores many different options and minimizes edges and dead areas, while always verifying that the rating of the design (by the layout predictor system) hasn't been damaged. More particularly, the wall alignment system achieves full minimization of wall edges and bumps in the unit, while maintaining or even improving the unit layout's design rating. This system achieves optimal walls alignment while maximizing the room's space and functionality, by applying mathematical calculations.

The wall alignment system utilizes feature analysis, definition and writing requirements by the architect writing the description for design alignment of walls and components to run after the placement of the walls and components to adjust the wall's location and eliminate unnecessary edges and bumps. The system is trained to identify dead areas and create techniques to eliminate them by transferring them to functional areas that would improve the efficiency and optimize the interior unit design. It also employs a cost function of room's space vs. minimization of the number of edges and dead areas in the unit.

In exemplary embodiments, an entrance floor layout design system or subsystem designs the entranceway, entrance floor, and other public areas of the building or portion of a building. This includes the lobby and other public areas adjusted to the individual program and its requirements and could also include other floor types such as cellar, commercial floor and parking. This system explores many different scenarios for different layouts and may use a machine learning prediction model to assist in rating the best entrance floor design which will maximize human comfort. It tries thousands of different placement options and uses the layout selector machine learning model to find the best one. By trying thousands of different options, the system achieves more optimized options in terms of space use and human comfort. This system generates a plan of additional public spaces and their sizes, proportions and inter-relations, defined by functionality and needs, adjusted by the path check system and accessibility, and synchronized with applying the public component placement.

The approach of entrance floor layout design system is similar to the one used for the typical floors. One difference is the nature of the data, since the entrance floor layout is very different and involves other rules and considerations. The design of the entrance floor may be by classic or ML-based algorithm. The classic algorithm involves implementation of a new set of rules and requirements. The ML-based algorithms are trained on examples of entrance floors instead of a single unit's interior designs, but the overall setup remains the same as in the options placement system.

The entrance floor layout design system utilizes feature analysis, definition and writing requirements by the architect, e.g., creating guidelines for the entry floor design according to given parameters such as lobby required size, access, exposures and proportions and other public amenities that are requested both by the code and the client. The system uses schematic requirements and relations between the public amenities combined with predefined relations to private areas such as garden apartments that could be located on the ground floors as well as data points to use for the best layout predictor.

An exemplary mechanical and structural design system or subsystem designs the mechanical, electrical, and plumbing systems for the building or portion of a building. This system creates preliminary design development of the MEP (Mechanical, Electrical and Plumbing) system design. This stage could include structural calculations and specifications and/or may suggest the optimal location of the structural components that would coordinate with the architectural design. This design may be based on the classical algorithmic approach, where the MEP system would be added to the footprint according to predefined rules. The automated nature of the process ensures that the different components are correlated.

This system enables the user to predefine the interrelations between the architectural design and the complex building systems design. The system streamlines and automates the process and substantially increases its efficiency, as it optimizes the coordination between the architectural and the building systems design. It includes a design mechanism that can be applied in the early stage of the architectural design in order to achieve optimized results of the complex coordination process. It adds the engineering layers to the machine learning model-layout predictor system, which adds the engineering layers as part of the design layout grading mechanism. It achieves optimization and efficiency of the process by implementing the engineering plans within the schematic design process, as an integral part of it. The building systems design and coordination process would significantly improve as the system automated design would increase standardization and repeatable design elements and would minimize human design errors that are so common in todays practice.

The mechanical and structural design system utilizes feature analysis, definition and writing requirements of the complex coordination process between the different systems by the architect, including identifying schematic relations, sizes and preferred location of the systems such as plumbing walls, shafts and structural components. The system utilizes summaries of the complex requirements of each system and guidelines for the systems components' optimal location in relation with the schematic architectural design as well as data points collection.

In exemplary embodiments, an environmental and energy code system or subsystem improves the environmental and energy performance of the building or portion of a building. This system uses bio-environmental design principles that optimize building performance by utilizing natural environmental factors. It analyzes the environment and creates automated design for key parameters such as: directions and views for facing rooms, windows and facades that would inhibit natural light and ventilation, suggested solar panels placement and implementation of combined heat, power plant and grey water recycling. Exemplary building design takes advantage of the natural energy of the sun and the wind, incorporating them into the automated architectural design. This system adds the layer of environmental design parameters to the machine learning model-layout selector system, which adds the layer of sustainability as part of the design layout grading mechanism. It achieves optimization in the process by implementing the sustainable design principles within the schematic design process and as an integral part of it.

This system is designed to be a flexible living organism that will incorporate future advances, envisioned as a universal solution, with principles that can be applied in any geography around the world. In exemplary embodiments, the system includes the energy code calculations that are mandatory in various municipalities, including but not limited to New York City. The environmental parameters would be embedded in other subsystems such as the public components placement system, the unit boundary splitter system, the options placement system, and the layout predictor system to create an environmentally efficient and sustainable design.

The environmental and energy code system relies upon and utilizes energy code and sustainable design data, feature analysis, definition and writing requirements by the architect implementing environmental design principles into the design process, that would optimize the layout in several core environmental aspects, e.g., determining window location based on directions, views and wind channels analysis, as well as data points collection. The system embeds environmental design principles into the automated design process to make sure that the design is environmentally sustainable.

In exemplary embodiments, synchronization between the overall system and method of designing buildings and portions of buildings and the above-described subsystems is done by a synchronization system. This system or subsystem synchronizes between the software and associated systems to create an optimal and compliant automated architectural plan according to the client's objectives. It integrates between several complex algorithms systems to achieve optimal design that would be superior to the human architect's design in terms of design and client's objectives. As described in detail, disclosed embodiments are complex systems that integrate different systems and subsystems, in some cases with a machine learning algorithm trained to grade and select permutations, and in exemplary embodiments converting the selected design to architectural, engineering and design software to enable the sale to the client with the format that they need.

The synchronization system utilizes feature analysis, definition and writing requirements by the architect, designs the architecture and execution of the integration between the algorithm that would create the permutation to the machine learning system that would be trained to grade the different permutations and select the optimal design according to the client's objectives. It could include conversion of the selected option to architectural, engineering and design software and implementation of the drawings in the client's set of drawings, at tier one of the Schematic Design (SD) would be SD drawings and at Tier 2 of Design Development (DD), would be a full set ready for Department of Buildings (DOB) submission. The synchronization system integrates the various complex algorithmic systems into one function of optimized design according to regulatory constraints and the client's objectives and provides the real estate developer or architect client a one-stop shop that delivers an immediate, complete and fully automated architectural design.

While the disclosed systems and devices have been described in terms of what are presently considered to be the most practical exemplary embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

Thus, it is seen that improved systems and methods of synthesizing building data, standardizing building design, and designing buildings and portions of buildings are provided. It should be understood that any of the foregoing configurations and specialized components may be interchangeably used with any of the systems of the preceding embodiments. Although illustrative embodiments are described hereinabove, it will be evident to one skilled in the art that various changes and modifications may be made therein without departing from the disclosure. It is intended in the appended claims to cover all such changes and modifications that fall within the true spirit and scope of the disclosure.

What is claimed is:

1. A machine learning system for designing buildings and portions of buildings, comprising:
   a set of one or more input requirements, including a set of floor plans, each of the floor plans verified against specified requirements;
   a relationships module defining a hierarchy of relationships between the one or more input requirements;
   an options placement system analyzing the one or more input requirements and the hierarchy of relationships and providing one or more optional feasible designs for a building or portion of a building, the options placement system including one or more machine learning models utilizing various architectural parameters;
   a layout predictor system training one or more machine learning models to score the one or more optional feasible designs by exposing the one or more optional feasible designs to analysis of floor plan designs and selecting an optimal feasible design based upon the one or more input requirements; and
   a design plan generator generating an architectural design plan and floor plans for the building or portion of a building;
   wherein when a request for a building or portion of a building design plan is made including new requirements, the one or more machine learning models output optimal floor plans to match the new requirements without starting to design from scratch.

2. The machine learning system of claim 1 further comprising a mechanical and structural design system designing a mechanical, electrical, and plumbing systems design for the building or portion of a building and coordinating between the architectural design plan and the mechanical, electrical, and plumbing systems design.

3. The machine learning system of claim 1 wherein the architectural design plan places all components on a predefined footprint in accordance with local regulatory requirements.

4. The machine learning system of claim 1 wherein the one or more input requirements include one more of: address, zoning, lot dimensions, building height, required setbacks, floor area ratio, maximum buildable area, different required units mix, and unit sizes and number, and the one or more machine learning models produce one or more floor plans optimized for the one or more input requirements.

5. The machine learning system of claim 1 wherein the options placement system includes one or more machine learning models producing one or more floor plans optimized for the one or more input requirements.

6. The machine learning system of claim 1 further comprising a component expansion system expanding components towards each other simultaneously and choosing an expansion strategy that optimizes an area of each component while verifying clear paths and clearances in the building or portion of a building.

7. The machine learning system of claim 1 further comprising an environmental and energy code system improving environmental and energy performance of the building or portion of a building.

8. The machine learning system of claim 1 wherein the design plan generator provides an architectural design for a neighborhood or an entire urban area.

9. The machine learning system of claim 1 further comprising an entrance floor layout design system designing public areas of the building or portion of a building.

10. A computer-implemented method of designing buildings and portions of buildings, comprising:
    creating a database of building components;
    receiving one or more input requirements and analyzing the one or more input requirements, the input requirements including a set of floor plans, each of the floor plans verified against specified requirements;
    designing and generating one or more optional feasible designs for a building or portion of a building;
    designing one or more optional feasible designs for one or more of: common public functional spaces, offices, suites, classrooms, hospital rooms, dwelling units, and an interior of each unit with its components; and
    when a request for an architectural design plan is made including new requirements, generating an architectural design plan for the building or portion of a building, the architectural design plan including optimal floor plans being output by one or more machine learning models to match the new requirements without starting to design from scratch.

11. The computer-implemented method of claim 10 further comprising designing a mechanical, electrical, and plumbing systems design for the building or portion of a building and coordinating between the architectural design plan and the mechanical, electrical, and plumbing systems design.

12. The computer-implemented method of claim 10 wherein the one or more input requirements include one more of: address, zoning, lot dimensions, building height, site plan, lot coverage, building footprint, required setbacks, floor area ratio, maximum buildable area, different required units mix, and unit sizes and number, and wherein one or more machine learning models produce one or more floor plans optimized for the one or more input requirements.

13. The computer-implemented method of claim 10 further comprising defining a hierarchy of relationships between the one or more input requirements and analyzing the hierarchy of relationships.

14. The computer-implemented method of claim 13 wherein the hierarchy of relationships includes one or more of: adjacency, dependency, and connectivity.

15. The computer-implemented method of claim 13 wherein the hierarchy of relationships includes definitions and guidelines for optimal design practice.

16. The computer-implemented method of claim 10 wherein the building or portion of a building comprises one or more individual units and further comprising defining and setting external boundaries between the one or more individual units.

17. The computer-implemented method of claim 10 further comprising checking for paths between components in the building or portion of a building and finding the shortest paths between components while ensuring that the shortest paths are wide enough to comply with egress requirements and other regulations.

18. The computer-implemented method of claim 10 wherein one or more machine learning models produce one or more floor plans optimized for the one or more input requirements.

19. A computer-implemented method of designing buildings and portions of buildings, comprising:
    creating a database of building components;
    receiving one or more input requirements and analyzing the one or more input requirements;

designing and generating one or more optional feasible designs for a building or portion of a building based on the one or more input requirements;

designing one or more optional feasible designs for one or more of: common public functional spaces, offices, suites, classrooms, hospital rooms, dwelling units, and an interior of each unit with its components;

checking for paths between components in the building or portion of a building and finding the shortest paths between components while ensuring that the shortest paths are wide enough to comply with egress requirements and other regulations;

expanding components towards each other simultaneously and choosing an expansion strategy that maximizes an area of each component while verifying clear paths and clearances in the building design;

synchronizing the simultaneous expansion of components with incorporating accessibility and building code regulatory requirements into an architectural design plan to verify that clearance requirements are being met while optimizing component sizes, functions, and shape ratios; and generating an architectural design plan for the building or portion of a building including an optimal feasible design that matches the one or more input requirements.

* * * * *